United States Patent [19]

Kotoh et al.

[11] Patent Number: 4,682,173
[45] Date of Patent: Jul. 21, 1987

[54] RADAR RESPONDER

[75] Inventors: Keigo Kotoh; Nobuhiro Nakamura, both of Kawanishi, Japan

[73] Assignee: Mitsubishi Denki Kabushiki Kaisha, Tokyo, Japan

[21] Appl. No.: 690,217

[22] Filed: Jan. 10, 1985

[30] Foreign Application Priority Data

Jan. 31, 1984 [JP] Japan .................................. 59-16252

[51] Int. Cl.⁴ .............................................. G01S 13/80
[52] U.S. Cl. .......................................... 342/51; 342/44
[58] Field of Search ............ 343/6.8 R, 6.8 LC, 6.5 R, 343/6.5 LC, 6.5 SS; 342/44, 51, 50, 42, 125

[56] References Cited

U.S. PATENT DOCUMENTS

| 3,373,425 | 3/1968 | Barischoff | 342/51 |
| 4,129,868 | 12/1978 | Tahara et al. | 343/6.8 R |
| 4,167,007 | 9/1979 | McGeoch et al. | 342/44 |
| 4,170,773 | 10/1979 | Fitzsimmons et al. | 342/42 |
| 4,510,497 | 4/1985 | Onozawa | 343/6.8 LC X |

FOREIGN PATENT DOCUMENTS

| 744055 | 2/1956 | United Kingdom . |
| 1185369 | 3/1970 | United Kingdom . |
| 1485880 | 9/1977 | United Kingdom . |
| 1505152 | 3/1978 | United Kingdom . |
| 2046059 | 11/1980 | United Kingdom . |
| 2070894 | 9/1981 | United Kingdom . |

Primary Examiner—T. H. Tubbesing
Assistant Examiner—Gilberto Barrón, Jr.
Attorney, Agent, or Firm—Birch, Stewart Kolasch & Birch

[57] ABSTRACT

A radar responder for transmitting an electric wave signal which sweeps a predetermined frequency deviation width including the reception frequencies of the searcher's radar a plurality of times, responding to the pulse-modulated radar signal from the searcher's radar. The responder is provided with a high frequency FM modulator having said frequency deviation width, generates a radar responding signal which repeats said sweeps a predetermined number of times with a predetermined period, and a distinction signal for distinguishing individual radar responder which repeats said sweeps with said period in a predetermined pattern.

5 Claims, 9 Drawing Figures

RADAR RESPONDER

FIELD OF THE INVENTION

The present invention relates to a radar responder, and more particularly, to that for transmitting a responding signal so as to indicate the position of a survivor, responding to a pulse-modulated radar signal from a searcher's radar which is commonly used in activities for searching survivors at sea.

BACKGROUND OF THE INVENTION

One prior art of such radar responder is shown in Japanese Patent Publication No. Sho. 55-31430.

In the radar responder (radar indicator) shown in said Japanese Patent Publication, when the radar responder held by a survivor at sea receives a radar pulse from a searcher's radar, the radar responder operates to transmit a radar responding signal which sweeps a predetermined frequency range with a predetermined period, responding thereto. When the searcher's radar receives the radar responding signal, continuous dotted lines with predetermined intervals therebetween are displayed on a radar scope which distinguish from the reflected signals from other radar reflectors so as to indicate the position of the survivor.

In such devices, it is only necessary to generate radar responding signals which have weak electric field intensity, and this can be accomplished by small and cheap devices. This also provides a wide range of use such as for life boats in large ships, for small ships, and for leisure boats. To be used commonly in such a wide range, it is an important object to prevent unnecessary and erroneous transmissions, thereby obtaining an accurate operation.

OBJECTS AND SUMMARY OF THE INVENTION

The present invention is directed to solve the problems pointed out above, and has for its object to provide a radar responder capable of being supervised of its operation.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to the present invention, there is provided a radar responder for transmitting an electric wave signal which sweeps a predetermined frequency deviation width including the frequencies of the searcher's radar signals, responding to the pulse-modulated radar signal from the searcher's radar, which, provided with a high frequency FM modulator having said frequency deviation width, generates a radar responding signal which repeats said sweeps a predetermined number of times with a predetermined period, and a distinction signal for distinguishing individual radar responders which repeats said sweeps with said period in a predetermined pattern.

DETAILED DESCRIPTION OF THE PREFERRED EMBODIMENTS

The present invention is invented considering the following points:

(1) In order to avoid the complexity of the device, the distinction signal for distinguishing individual radar responder is preferred to have a signal form similar to that of the radar responding signal, and therefore, it is desirable to transmit continuous dotted lines modulated by a distinction number code signal subsequent to the radar responding signal.

(2) However, if it is presumed that the system has one million applicants, there arises a problem that the length of the number code becomes about fifty bits. That is, the radar responder is designed to transmit an electric wave radar responding signal comprising continuous dotted lines and a distinction signal of about fifty bits subsequent thereto for each hit of radar pulse, and thus tremendously long continuous dotted lines will be arranged on the radar scope, thereby making it difficult to read. Also, the hit number of radar pulses from the searcher's radar is restricted because it is necessary to provide a long distinction signal, thereby decreasing the number of repetition times of receiving the responding signal at the searcher's radar. On the other hand, if a rapid distinction method is executed so as to transmit a distinction code signal having a large number of bits in a repetition period of radar pulses, the time required for detecting 1 bit in the radar receiver is shortened. These methods equally result in the decrease of the reception sensitivity.

(3) Accordingly, the present invention is based on the idea that when the radar responder is far from the searcher's radar, the radar responder transmits a radar responding signal, an abbreviated distinction signal, or, transmits one portion of a distinction number code signal which can be easily recognized to be different from the radar responding signal, and when the radar responder comes close to the searcher's radar, the radar responder transmits all of the distinction number code signal, these two states being switched automatically.

Figure 1:
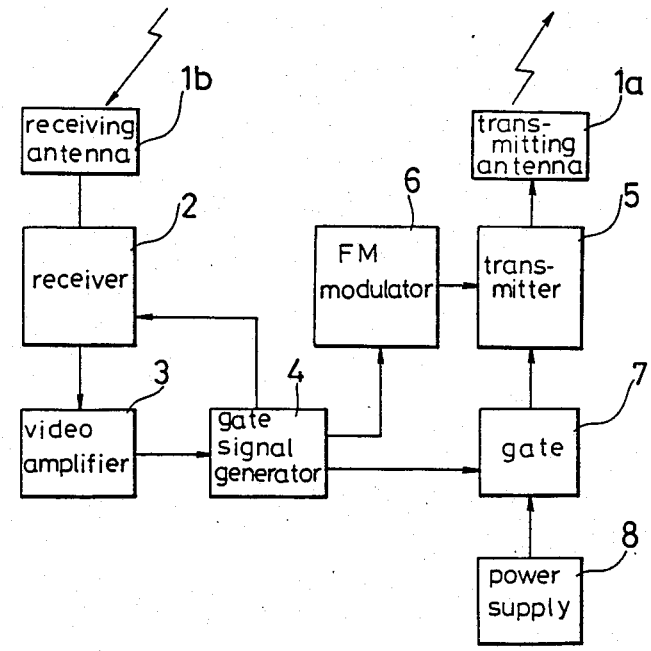
FIG. 1 is a block diagram of a radar responder as one embodiment of the present invention.

Reference will now be particularly made to FIG. 1, wherein one embodiment of the present invention is illustrated. The reference numeral 1b designates a receiving antenna, the reference numeral 2 designates a receiver which receives the radar signal transmitted from the searcher's radar and outputs a video signal according thereto. The reference numeral 3 designates a video amplifier which amplifies the video signal. The reference numeral 4 designates a gate signal generator which receives the output of the video amplifier 3 at its control input and outputs a gate signal corresponding to the radar signal to an FM modulator 6 and a gate 7.

The reference numeral 1a designates a transmitting antenna, and the reference numeral 5 designates a transmitter which receives the indented wave modulated signal from the FM modulator 6. An oscillator provided in the transmitter 5 is frequency modulated by the signal from the FM modulator 6. The reference numeral 7 designates a gate which, receiving the gate signal from the gate signal generator 4, controls the operation of the transmitter 5 by controlling the supply of power from the power supply 8 to the transmitter 5.

Figure 2:
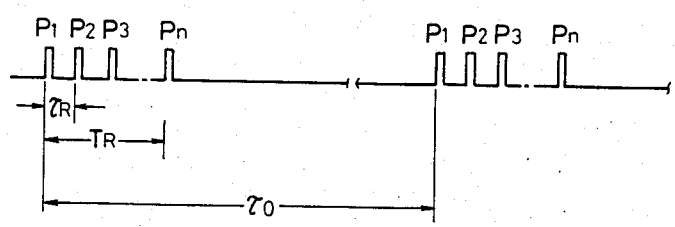
FIG. 2 is a diagram showing pulses output from the radar responder which received the radar pulses.

The device operates as follows:

Radar pulses from the searcher's radar are led to the receiver 2 through the receiving antenna 1b, and they are detected by the receiver 2. The detected pulses are shown in FIG. 2. In the Figure, the reference character $\tau_0$ designates the time required for the antenna of the searcher's radar rotating one cycle. The reference character $\tau R$ designates a repetition period of emission of radar pulses. The width of the antenna beam of the searcher's radar is usually about ±1°, and the radar responder receives radar signals continuously during the time period TR when the searcher's radar is directed towards the radar responder within the angle of ±1°, and detection outputs $P_1, P_2, \ldots, P_n$ are obtained. In this case, $TR/\tau_0$ becomes nearly equal to $2°/360° = 1/180$.

When the searcher's radar comes close to the radar responder, the receiver 2 outputs detection output Pi even if the antenna of the searcher's radar is not directed towards the radar responder within the angle of ±1°, influenced by the side lobes of the antenna of the searcher's radar. Thus, the time period TR during when the detection output is obtained increases gradually as the searcher's radar comes nearby, finally leading to $\tau_0$.

Figure 3:
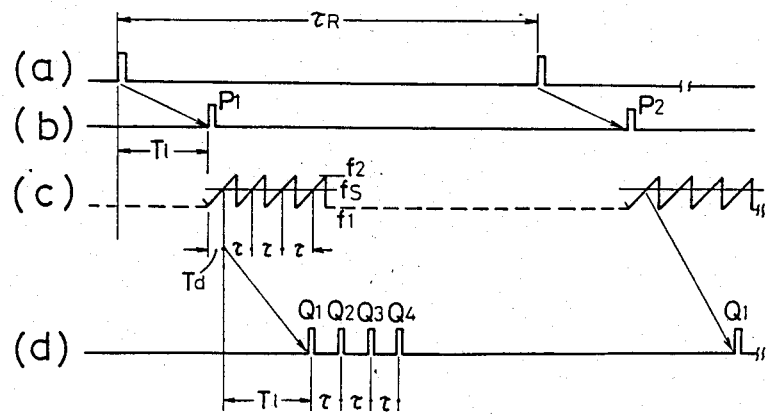
FIG. 3 is a diagram showing the received signal and the transmitted signal by the radar responder.

The gate signal generator 4 generates a gate signal from the detection output which signal is required for some elements in the device. The relation between the received signal and the transmitted signal is shown in FIG. 3, wherein like reference numerals are used to designate like or corresponding elements as those in FIG. 2. FIG. 3 (a) shows the radar pulses emitted from the searcher's radar at each time of $\tau R$. FIG. 3 (b) shows the detection outputs of the radar responder upon reception of the radar pulses. The distance L from the searcher's radar to the radar responder is C.Tl where C designates light velocity. Hereupon, the delay time in the radar responder is ignored for simplicity.

The gate pulse is sent from the gate signal generator 4 to the gate 7 when a detection signal is output, and electric power is supplied to the transmitter 5. At the same time the FM modulator 6 is driven to generate an indented wave modulated signal shown in FIG. 3(c). The modulated signal is applied to the transmitter 5 to generate a radar responding signal which sweeps the frequency range from $f_1$ to $f_2$ shown in FIG. 3(c). Hereupon, $f_1$ and $f_2$ are preferably set to cover the receiving frequencies of various kinds of searcher's radars, for example, such that $f_1 = 9340$ MHz and $f_2 = 9480$ MHz.

The radar responding signals are transmitted to the searcher's radar through the transmitting antenna 1a. The reception frequency of the searcher's radar is set at a frequency fs between the two frequencies $f_1$ and $f_2$. At the searcher's radar the sweeping frequency of the radar responding signal is detected each time when it passes the frequency fs, thereby to output the video signal shown in FIG. 3(d)(designated by $Q_1, Q_2, Q_3$, and $Q_4$), and they are displayed as continuous dotted lines on the radar scope. The reference character Td designates a time from the start of the sweep to the time when the sweep frequency becomes fs.

The sweeps in frequency from $f_1$ to $f_2$ are executed with a predetermined period a predetermined number of times each time the radar responder receives the radar pulse from the searcher's radar. In the case shown in FIG. 3(c), the sweep period is $\tau$ and the repetition number is 4, and therefore, four points of continuous dotted lines appear on the radar scope of the searcher's radar.

The gate signal is input to the receiver 2 so as to prevent the receiver 2 from falling in its self-oscillation state caused by the transmitted signal being input to the receiver 2 when the transmission is executed after the received signal is detected. The gate signal operates to make the receiver 2 inoperable from the detection of a signal to the completion of transmission, and further to set the receiver 2 in an operable state after the transmission is completed.

It is a feature of the present invention that a distinction signal is transmitted in addition to the radar responding signal by a radar responder which executes the aforementioned fundamental operation, and wherein a number code signal for distinguishing the individual radar responder is arranged subsequent to the radar responding signal as a similar sweep signal.

Figure 4:
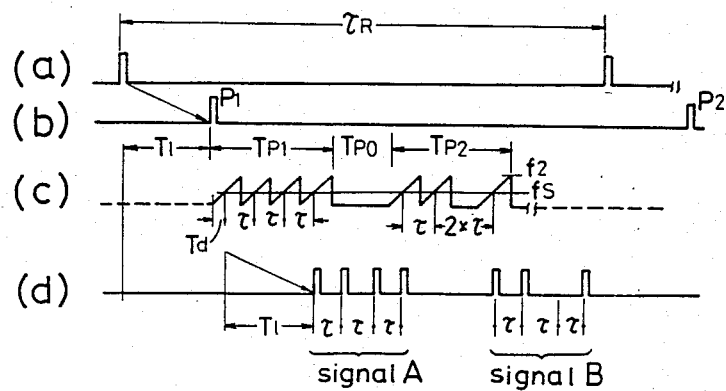
FIG. 4 is a diagram explaining the relation between signals in the radar responding signal.

The signals are shown in FIG. 4.

The radar responding signal in the conventional device is represented as a signal A and the distinction signal is represented by a signal B in FIG. 4(d). There is provided a time interval of two sweep time periods in order to distinguish the signal A from the signal B. The number code of the distinction signal is (1.1.0.1). In FIG. 4(c), the reference character TP1 designates a continuous time period for the signal A, and the reference character TP2 designates a continuous time period for the signal B, and the reference character TP0 designates a space time between the two signals.

Figure 5:
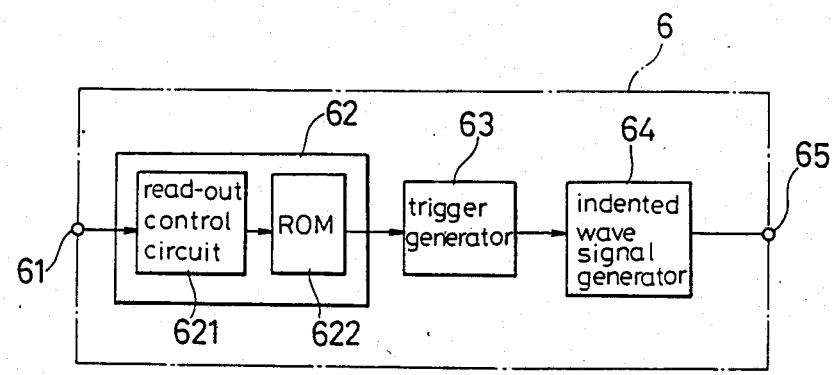
FIG. 5 is a diagram showing the construction of a FM modulator.

The construction of the FM modulator 6 which generates such two signals A and B is shown in FIG. 5. The reference numeral 61 designates an input terminal of the FM modulator 6 which receives a driving signal from the gate signal generator 4. The reference numeral 62 designates a code signal generator which generates a code signal including the signal A and the signal B. The code signal generator 62 outputs a code signal by reading out a desired one among the code signals stored in the read only memory (hereinafter referred to as "ROM") 622 by the read-out control circuit 621.

In the illustrated embodiment of FIG. 4, the signal A is (1.1.1.1) and the signal B is (1.1.0.1), and the code signal (1.1.1.1.0.0.1.1.0.1) comprising the two signals A and B and a space inserted therebetween is stored in the ROM 622, and it is read out by the read-out control circuit 621 when predetermined requirements are satisfied. The reference numeral 63 designates a trigger generator, and the numeral 64 designates an indented wave signal generator which generates an indented wave signal shown in FIG. 4(c) upon reception of the code signal.

The total operation will be described as follows:

The transmitter 5 is operated to sweep the frequency range from $f_1$ to $f_2$ in accordance with the signal from the FM modulator 6, and the code signal read out from the ROM 622 and transmitted from the transmitter 5 is detected by the searcher's radar and displayed on the radar scope thereof. By this operation, it is possible to receive the radar responding signal (the signal A) from a survivor's radar responder as continuous dotted lines, distinguished from the reflected waves from other reflectors, and it is also possible to distinguish relatively simple matters such as kinds of shipwrecked ships from the content of the dotted lines caused by the signal B on the radar scope.

The content of the code signal can be optionally altered by altering the codes to be stored in the ROM 622 and the designation of the read-out address thereof. However, if it is tried to distinguish the individual radar responder directly, the code signal becomes lengthy to a great extent, thereby making it difficult to observe it directly on the radar scope.

Furthermore, depending on the repetition frequency of the radar pulses, the bit number of distinction code is restricted to be under a required number, whereby the bit number for unit time must be made small. These equally result in the decrease of the reception sensitivity.

Furthermore, the bit number becomes large with the repetition frequency of the radar pulses being held at a predetermined value, thereby shortening the time for detecting each bit in the radar receiver when a rapid sweep is executed. This also results in the decrease of the receiving speed.

Against this problem, the following are considered as solutions:

The first method is to transmit a distinction signal which shows only, for example, the kind of ship as the signal B when the radar responder is far from the searcher's radar, and thereafter, transmits a lengthy distinction signal of about 50 bits as the signal B by switching the ROM 622 by the control of the read-out control circuit 621 when the radar responder comes close to the searcher's radar, thereby making the $TR/\tau_0$ large.

In this method, when the searcher's radar comes close to the survivor, the searcher's radar can receive the radar responding signal from the radar responder stably, thereby enabling confirmation of the content of the distinction code signal by taking photographs of the dotted lines on the radar scope.

The confirmation of the distinction code signal is not necessary while searching for survivors, and it is only necessary after the position of the survivor is located. It is also unnecessary for assistant ships for searching for survivors. It is only necessary for official searching ships such as patrol boats. Accordingly, it is only necessary to provide such ships with a device which takes out the video signal of the searcher's radar and applies a processing to the same to analyze the code signal, and such a device makes it unnecessary to use a primitive method such as taking photographs.

The second method is to switch the code signal, that is, the signal B cyclically while the radar responder continuously receives the radar pulses from the searcher's radar, wherein one cycle of the distinction code signal may represent the whole of a distinction code signal. For example, in a case where a cycle for switching a code signal comprises ten steps, it is possible to constitute a system in such a manner that each signal B comprises 5 bits, one step comprises about 100 hits of detection signals of radar pulses, and ten steps thereof constitute a detection code signal. The radar responder completes the full transmission of the code signals when it receives 1,000 (=100×10) hits of radar pulses from the searcher's radar. The time required for confirming the detection code signal of the radar responder is about one second because the repetition frequency of a usual radar is about 1,000 pps.

The first and the second methods described above can be executed by controlling the switching of the ROM 622 by the read-out control circuit 621 in the code signal generator 62 in accordance with the result of the detection signals Pi.

Figure 6:
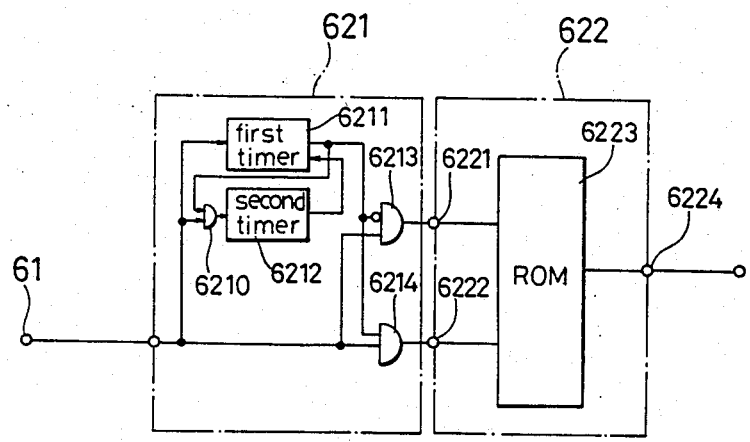
FIG. 6 is a diagram showing the construction of a code signal generator.

FIG. 6 shows a construction which adopts such a control method. The same numerals are used to designate the same or corresponding elements as those shown in FIG. 5. The reference numeral 6211 designates a first timer which outputs an ON signal when the detection signal Pi is input to the input terminal 61 successively more than a predetermined number of times, and which outputs an OFF signal when it is not input successively more than the aforementioned number of times or the detection signal is stopped to be input. The reference numeral 6212 designates a second timer which outputs an ON signal in co-operation with an AND gate 6210 a predetermined time after the output of the first timer 6211 becomes ON, and outputs an OFF signal in other cases. When the second timer 6212 outputs an ON signal, the first timer 6211 is reset to restore its start state. The reference numeral 6213 designates a first logic circuit which leads the detection output Pi input to the input terminal 61 to the input terminal 6221 of the ROM 622, and further leads the distinction code signal stored corresponding to the input terminal 6221 to the output terminal 6224 when the output of the first timer 6211 is OFF. The reference numeral 6214 designates a second logical circuit which leads the detection output Pi input to the input terminal 61 to the input terminal 6222 of the ROM 622 and further leads the distinction code signal stored corresponding to the input terminal 6222 to the output terminal 6224 when the output of the first timer 6211 is ON.

Figure 7:
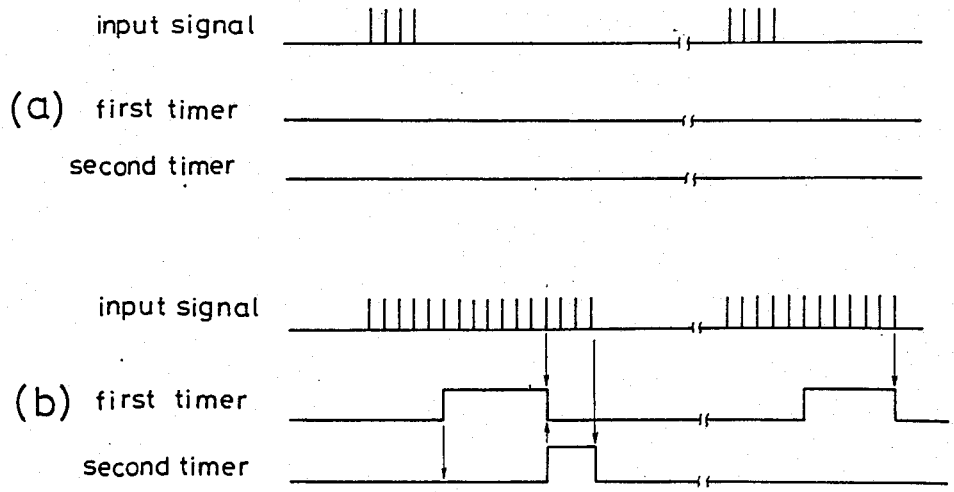
FIG. 7 is a diagram explaining the operation of the code signal generator.

The operation of the device will be described with reference to FIG. 7, where FIG. 7 (a) shows signals in a case where the number of repetition times of the detection output Pi is obtained successively is small, and FIG. 7 (b) shows signals in a case where the aforementioned number is large.

When the aforementioned number is small, the outputs of the first and the second timer 6211 and 6212 are both OFF as shown in FIG. 7(a), and the first input terminal 6221 of the ROM 622 is in a driven state, and the first code signal of simple construction indicating the kind of a ship or the like is transmitted as the signal B. Accordingly, the radar responding signal A, and the distinction signal B constituted by the first code signal are transmitted as a radar responding signal.

When the aforementioned number becomes large, the output of the first timer 6211 becomes ON as shown in FIG. 7(b), and the ROM 622 which has been receiving an input at the input terminal 6221 becomes to receive an input at the other input terminal 6222. Accordingly, a system adopting the first method can be constituted by establishing the signal B corresponding to the input terminal 6221 to be of a simple construction and the signal B corresponding to the input terminal 6222 to be composed of a distinction code signal for distinguishing individual radar responder.

When the aforementioned number is tremendously large, the first timer 6211 is reset to restore its start state by the second timer 6212, thereby switching the signal B alternatively between the simple code signal and the distinction code signal.

Under the system adopting the second method, a required number of read-out control terminals are provided as the input terminals of the ROM 622, code signals corresponding thereto are stored in the ROM 622, and each portion of the distinction signal which is obtained by dividing the distinction signal into a plurality of portions is alternatively switched in accordance with the number of subsequent signal detections similar to the first method.

Besides, if the oscillation frequency of the radar aboard a searcher's ship is a little detuned, only the radar responding signal from the radar responder can be displayed on a radar scope, distinguished from usual echos such as a ship echo caused by a radar pulse or a ground echo, and this makes it easy to distinguish the code.

Furthermore, the content of the distinction signal included in the repeatedly sweeping signal can be changed in accordance with the number of subsequent detection signal of the searcher's radar signal so as to transmit a plurality of kinds of code signals, thereby ensuring distinction of individual radar responders while maintaining the reception sensitivity and the detection of response from the radar responder.

Figure 8:
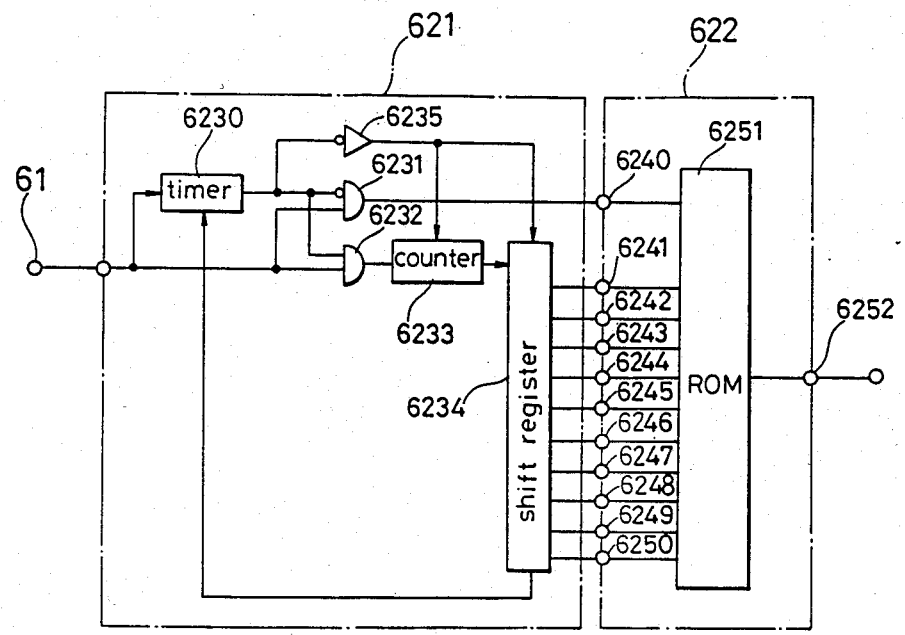
FIG. 8 is a circuit diagram showing another embodiment of the present invention.
Figure 9:
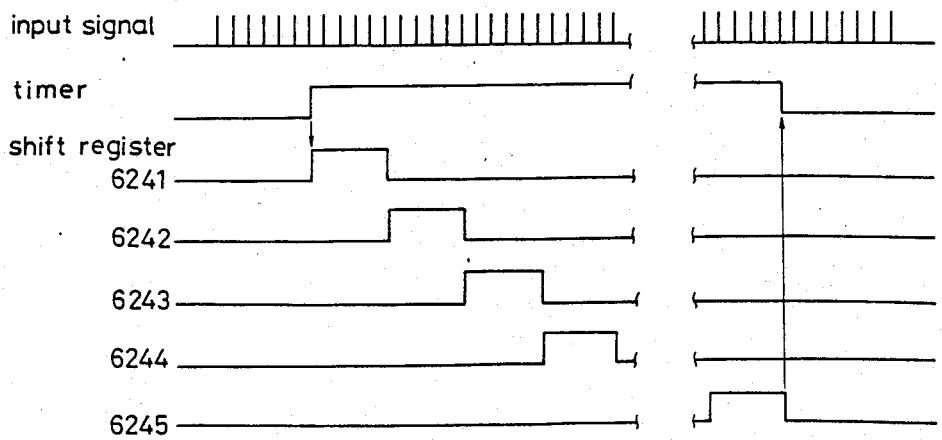
FIG. 9 is a timing diagram explaining the operation of the circuit of FIG. 8.

FIG. 8 shows a circuit diagram of a radar responder as a second embodiment of the present invention which adopts the above-described control method. The reference numeral 6230 designates a timer which outputs an ON signal when the detection signal Pi is input to the input terminal 61 successively more than a predetermined number of times, and outputs an OFF signal when the number of times of detection does not exceed the predetermined number or when the detection signal Pi is stopped to be input. The numeral 6235 designates an inhibiting circuit. The numeral 6231 designates an AND circuit which leads the detection signal Pi to the input terminal 6240 of the ROM 622, and leads the corresponding code signal to the output terminal 6252 when the timer 6230 outputs an OFF signal. The numeral 6232 designates an AND circuit. When the timer 6230 outputs an ON signal, the detection signal Pi is led to the counter 6233 by the AND circuit 6232, and the output pulse of the counter 6233 is led to the shift register 6234, for example, each time the detection signal pi is output by 100 hits. Accordingly, the shift register 6234 switches the input terminals 6241 to 6250 at said each timing of 100 hits, and leads one portion of the corresponding code signal to the output terminal 6252. Besides, the shift register 6234 resets the timer 6230 to restore to the start state thereof at the conclusion of one cycle. The counter 6233 and the shift register 6234 are reset to restore to the start state thereof by the OFF output of the timer 6230. This operation is shown in FIG. 9. When the output of the timer 6230 is OFF, a simple code signal of small bit number is output as the signal B, and when that is ON the code signal of large bit number is dividingly output. This means that a system adopting said second method is constituted. Hereupon, the maximum count value of the counter 6233 and the bit number of the shift register 6234 is not restricted to those shown in FIGS. 8 and 9.

As evident from the foregoing description, according to the present invention when the radar responder receives radar pulses from the searcher's radar the responder transmits a radar responding signal which sweeps a predetermined frequency deviation width with a predetermined period and a distinction signal for distinguishing individual radar responder which repeats the same sweeps as that of the former signal, thereby ensuring detection of response from the radar responder, distinguished from the radar reflected waves from other objects, and further ensuring distinction of the radar responder at the side of the searcher's radar.

What is claimed is:

1. A radar responder for transmitting an electric wave signal in response to a radar signal from a searcher's radar, comprising:

FM modulator means for sweeping said electric wave signal across a predetermined frequency deviation width including the reception frequency of said searcher's radar a predetermined number of times within a predetermined period to produce a radar responding signal, in response to the reception of said radar signal;

said modulator means including means for modulating said radar responding signal to produce a distinction signal for distinguishing an individual radar responder, and means for abbreviating said distinction signal when said searcher's radar is more than a predetermined distance from said radar responder and transmitting said distinction signal in full when said searcher's radar is less than said predetermined distance from said radar responder.

2. A radar responder as defined in claim 1, wherein said means for modulating comprises:

a code signal generator which generates a code signal for the radar responding signal and a code signal for the distinction signal;

a trigger generator which generates a trigger signal when the code signals are input thereto; and an indented wave signal generator which generates an indented wave signal upon reception of said trigger signal.

3. A radar responder as defined in claim 2, wherein the code signal generator comprises:

a memory for storing the code signal for the radar responding signal and two kinds of code signals having different numbers of bits for the distinction signal; and a read-out control circuit which reads out the code signals from the memory, switching the code signal to be read out from that of a short bit number corresponding to said abbreviated signal, to that of a long bit number corresponding to said full distinction signal when the searcher's radar signal is detected successively more than a predetermined number of times.

4. A radar responder as defined in claim 2, wherein the code signal generator comprises:

a memory for storing the code signal for the radar responding signal and two kinds of code signals having different numbers of bits for the distinction signal; and a read-out control circuit which reads out the code signals from the memory, switching the code signal to be read out from that of a short bit number corresponding to said abbreviated signal, to each portion of a long bit number corresponding to said full distinction signal, which portion is obtained by dividing the long bit number into a plurality of portions, when the searcher's radar signal is detected successively more than a predetermined number of times.

5. A radar responder as defined in claim 4, wherein the memory stores each said portion of the long bit number, and the read-out control circuit reads out said each portion of the long bit number stored in the memory every time the searcher's radar signal is detected successively the predetermined number of times.

* * * * *